(12) United States Patent
Weng

(10) Patent No.: US 11,852,962 B2
(45) Date of Patent: Dec. 26, 2023

(54) LIGHT SOURCE MODULE AND PROJECTION DEVICE

(71) Applicant: Coretronic Corporation, Hsin-Chu (TW)

(72) Inventor: Yi-Hsuang Weng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/467,469

(22) Filed: Sep. 7, 2021

(65) Prior Publication Data

US 2022/0082918 A1   Mar. 17, 2022

(30) Foreign Application Priority Data

Sep. 17, 2020 (CN) .......................... 202010980395.1

(51) Int. Cl.
*G03B 21/20* (2006.01)
*G02B 19/00* (2006.01)
(Continued)

(52) U.S. Cl.
CPC ..... *G03B 21/2013* (2013.01); *G02B 19/0019* (2013.01); *G02B 26/008* (2013.01);
(Continued)

(58) Field of Classification Search
CPC .............. G03B 21/2013; G03B 21/204; G03B 21/2066; G03B 21/208; G02B 19/0019;
(Continued)

(56) References Cited

U.S. PATENT DOCUMENTS

2010/0302514 A1\* 12/2010 Silverstein ........... G02B 27/143
353/37
2012/0275149 A1\* 11/2012 Huang ................. G02B 27/102
362/235
(Continued)

FOREIGN PATENT DOCUMENTS

CN  102449532  5/2012
CN  105487236  4/2016
(Continued)

OTHER PUBLICATIONS

"Office Action of China Counterpart Application", dated Feb. 8, 2023, p. 1-p. 11.

*Primary Examiner* — Magda Cruz
(74) *Attorney, Agent, or Firm* — JCIPRNET

(57) ABSTRACT

A light source module includes a light-collecting lens, a first light source unit, a first light-combining element, a second light source unit, a second light-combining element, and a third light source unit. The first, second, and third light source units are respectively configured to emit a first, second, and third light beams. The first and second light-combining elements are configured to respectively reflect the first and second light beams to the light-collecting lens disposed in a transmission path of the third light beam. An optical axis of the light-collecting lens is parallel to a first direction, and an optical axis of the first light source unit is parallel to a second direction. The first and second light source units and the first and second light-combining elements are disposed in an alternating manner in a third direction perpendicular to the first and second directions. A projection device is also provided.

26 Claims, 8 Drawing Sheets

(51) Int. Cl.
*G02B 27/14* (2006.01)
*G02B 26/00* (2006.01)

(52) U.S. Cl.
CPC ........... *G02B 27/14* (2013.01); *G03B 21/204* (2013.01); *G03B 21/2066* (2013.01)

(58) Field of Classification Search
CPC .. G02B 26/008; G02B 27/14; G02B 19/0057; G02B 19/0028
See application file for complete search history.

(56) References Cited

U.S. PATENT DOCUMENTS

| | | | |
|---|---|---|---|
| 2017/0115554 A1* | 4/2017 | D'Oosterlinck | G02B 27/14 |
| 2017/0351167 A1* | 12/2017 | Wu | F21V 7/0066 |
| 2019/0339602 A1* | 11/2019 | Pan | G03B 21/2033 |
| 2021/0243415 A1* | 8/2021 | Chen | G03B 21/2066 |
| 2021/0247679 A1* | 8/2021 | Chang | G03B 21/208 |
| 2021/0278683 A1* | 9/2021 | Hou | G02B 19/0057 |

FOREIGN PATENT DOCUMENTS

| | | | | |
|---|---|---|---|---|
| CN | 211318969 | | 8/2020 | |
| CN | 211348976 U | * | 8/2020 | ............ G03B 21/20 |
| TW | 200743822 | | 12/2007 | |
| TW | 201303364 | | 1/2013 | |

* cited by examiner

LIGHT SOURCE MODULE AND PROJECTION DEVICE

CROSS-REFERENCE TO RELATED APPLICATION

This application claims the priority benefit of China application serial no. 202010980395.1, filed on Sep. 17, 2020. The entirety of the above-mentioned patent application is hereby incorporated by reference herein and made a part of this specification.

BACKGROUND

Technical Field

The disclosure relates to an optical module and an optical device, and particularly relates to a light source module and a projection device.

Description of Related Art

A projector may provide a large display image with a smaller device volume. Compared to a large-size display, the projector may provide a larger image at a lower cost. As such, the projector occupies an irreplaceable place in display field. In addition, the projector is developing towards high brightness, so that users may see the image clearly without turning off all lights in the room. In addition to the development towards high brightness, the projector is also developing towards a smaller volume to achieve an advantage of portability.

However, in order to meet the requirement of high brightness, light sources are adjusted first most of the time. For instance, the number of light-emitting elements in a light source is increased. Nevertheless, an increase in the light-emitting elements may increase the overall volume of the light source of a projector.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure is directed to a light source module and a projection device including the light source module through which a requirement of high brightness is satisfied through an alternating arrangement design without an excessive increase in volume.

Other objects and advantages of the disclosure may be further illustrated by the technical features broadly embodied and described as follows.

In order to achieve one or a portion of or all of the objects or other objects, an embodiment of the disclosure provides a light source module. The light source module includes a light-collecting lens, a first light source unit, a first light-combining element, a second light source unit, a second light-combining element, and a third light source unit. The first light source unit is configured to emit a first light beam. The first light-combining element is disposed in a transmission path of the first light beam, and reflects the first light beam to the light-collecting lens. The second light source unit is configured to emit a second light beam. The second light-combining element is disposed in a transmission path of the second light beam, and reflects the second light beam to the light-collecting lens. The third light source unit is configured to emit a third light beam, and the light-collecting lens is disposed in a transmission path of the third light beam. An optical axis of the light-collecting lens is parallel to a first direction, an optical axis of the first light source unit is parallel to a second direction, the first light source unit and the second light source unit are disposed in an alternating manner in a third direction, and the first light-combining element and the second light-combining element are disposed in an alternating manner in the third direction, wherein the first direction, the second direction, and the third direction are perpendicular to one another.

In order to achieve one or a portion of or all of the objects or other objects, another embodiment of the disclosure provides a projection device including an illumination system, a light valve, and a projection lens. The illumination system is configured to provide an illumination light beam, and the illumination system includes a light source module. The light source module is configured to provide an excitation light beam, and the light source module includes a light-collecting lens, a first light source unit, a first light-combining element, a second light source unit, a second light-combining element, and a third light source unit. The first light source unit is configured to emit a first light beam. The first light-combining element is disposed in a transmission path of the first light beam, and reflects the first light beam to the light-collecting lens. The second light source unit is configured to emit a second light beam. The second light-combining element is disposed in a transmission path of the second light beam, and reflects the second light beam to the light-collecting lens. The third light source unit is configured to emit a third light beam, and the light-collecting lens is disposed in a transmission path of the third light beam. An optical axis of the light-collecting lens is parallel to a first direction, an optical axis of the first light source unit is parallel to a second direction, the first light source unit and the second light source unit are disposed in an alternating manner in a third direction, and the first light-combining element and the second light-combining element are disposed in an alternating manner in the third direction, wherein the first direction, the second direction, and the third direction are perpendicular to one another. The excitation light beam includes the first light beam, the second light beam and the third light beam, and the excitation light beam forms the illumination light beam. The light valve is disposed in a transmission path of the illumination light beam to convert the illumination light beam into an image light beam. The projection lens is disposed in a transmission path of the image light beam for projecting the image light beam out of the projection device.

In the light source module and the projection device including the light source module of the embodiments of the disclosure, the light source units and the light-combining elements are disposed in an alternating manner, and the light source module may thus exhibit a reduced volume.

In a limited space, the most light source units are accommodated and are used together with the light-combining elements. In this way, the light beams are effectively transmitted, and the demand for high brightness is achieved.

To make the aforementioned more comprehensible, several embodiments accompanied with drawings are described in detail as follows.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "left," "right," "front," "back," etc., is used with reference to the orientation of the Figure(s) being described and are not intended to be limiting of the disclosure.

Figure 1A:
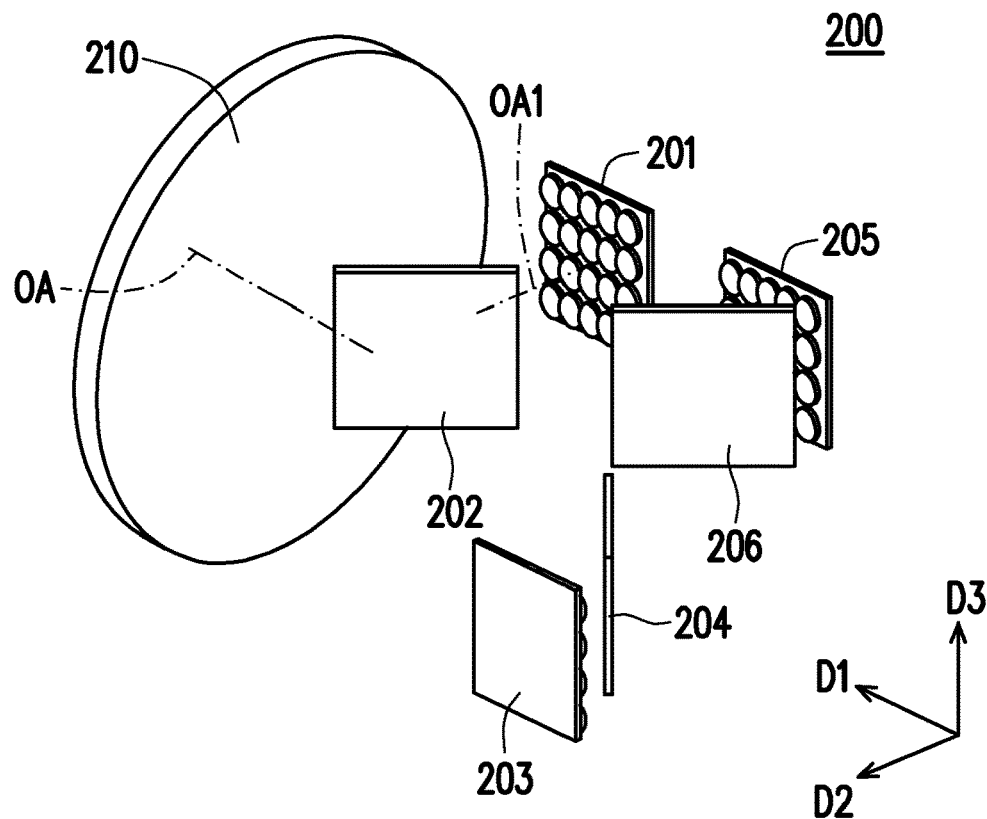
FIG. 1A and FIG. 1B are respectively a structural view and a top view of a light source module according to a first embodiment of the disclosure.
Figure 1B:
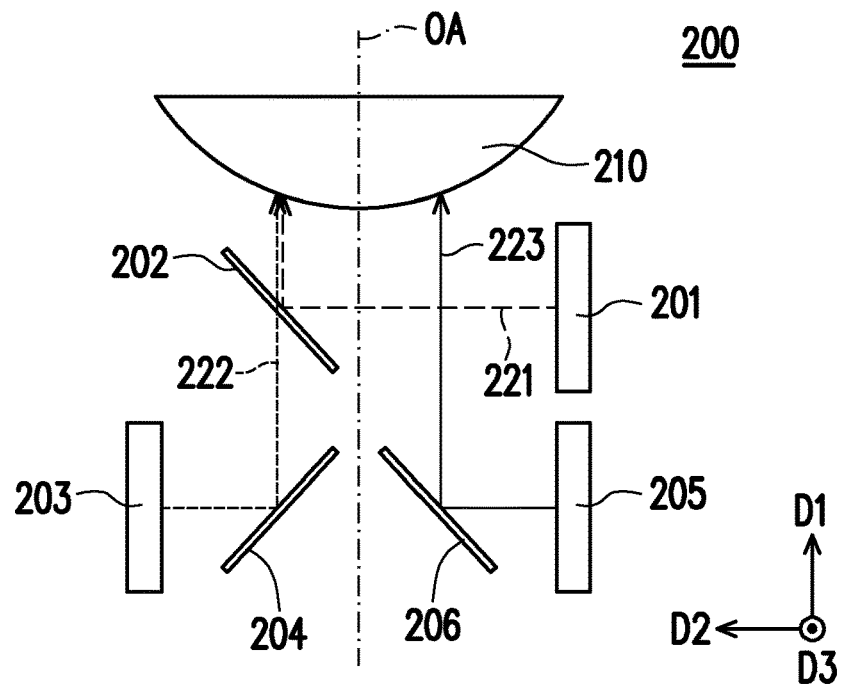

Referring to FIG. 1A and FIG. 1B first, FIG. 1A and FIG. 1B are respectively a structural view and a top view of a light source module 200 according to a first embodiment of the disclosure.

The first embodiment of the disclosure provides the light source module 200. The light source module 200 includes a light-collecting lens 210, a first light source unit 201, a first light-combining element 202, a second light source unit 203, a second light-combining element 204, and a third light source unit 205. The first light source unit 201 is configured to emit a first light beam 221. The first light-combining element 202 is disposed in a transmission path of the first light beam 221, and reflects the first light beam 221 to the light-collecting lens 210, i.e., the first light beam 221 emitted from the first light source unit 201 is first projected to the first light-combining element 202, and after being reflected by the first light-combining element 202, the first light beam 221 reaches the light-collecting lens 210. The second light source unit 203 is configured to emit a second light beam 222. The second light-combining element 204 is disposed in a transmission path of the second light beam 222, and reflects the second light beam 222 to the light-collecting lens 210, i.e., the second light beam 222 emitted from the second light source unit 203 is first projected to the second light-combining element 204, and after being reflected by the second light-combining element 204, the second light beam 222 reaches the light-collecting lens 210. The third light source unit 205 is configured to emit a third light beam 223, and the light-collecting lens 210 is disposed in a transmission path of the third light beam 223. The first light-combining element 202 and the second light-combining element 204 may be mirrors, or beam splitters adapted to provide a reflection function or a transmission function to light according to a wavelength of the light, but the disclosure is not limited thereto. The first light-combining element 202 and the second light-combining element 204 may be any elements with reflective characteristics. In addition, the first light source unit 201, the second light source unit 203, and the third light source unit 205 may respectively include a laser diode array, but the disclosure is not limited thereto.

In the first embodiment, an optical axis OA of the light-collecting lens 210 is parallel to a first direction D1, and an optical axis OA1 of the first light source unit 201 is parallel to a second direction D2. The first light source unit 201 and the second light source unit 203 are disposed in an alternating manner in a third direction D3, and the first light-combining element 202 and the second light-combining element 204 are disposed in an alternating manner in the third direction D3. In detail, as shown in FIG. 1A and FIG. 1B, the first light source unit 201 and the first light-combining element 202 are located at an upper part relative to the optical axis OA of the light-collecting lens 210, and the second light source unit 203 and the second light-combining element 204 are located at a lower part relative to the optical axis OA of the light-collecting lens 210, where the first direction D1, the second direction D2, and the third direction D3 are perpendicular to one another.

In the embodiment, referring to FIG. 1B, the first light source unit 201 and the second light source unit 203 are also disposed in an alternating manner in the first direction D1, and the first light-combining element 202 and the second light-combining element 204 are also disposed in an alternating manner in the first direction D1. That is, the first light source unit 201 and the second light source unit 203 are disposed back and forth in an alternating manner in the first direction D1, and the first light-combining element 202 and the second light-combining element 204 are also disposed back and forth in an alternating manner in the first direction D1.

In the embodiment, referring to FIG. 1A, the second light beam 222 reflected by the second light-combining element 204 is transmitted to the light-collecting lens 210 through a space on one side of the first light-combining element 202 in the third direction D3. In detail, according to FIG. 1A, the first light-combining element 202 is arranged at the upper part relative to the optical axis OA of the light-collecting lens 210, and the second light-combining element 204 is arranged at a lower part relative to the optical axis OA of the light-collecting lens 210, so that the second light beam 222 reflected by the second light-combining element 204 passes through the space under the first light-combining element 202 and is transmitted to the light-collecting lens 210.

In the embodiment, referring to FIG. 1A and FIG. 1B, the light source module 200 further includes a third light-combining element 206, which is disposed in a transmission path of the third light beam 223 and reflects the third light beam 223 from the third light source unit 205 to the light-collecting lens 210. That is, the third light beam 223 emitted by the third light source unit 205 is first projected to the third light-combining element 206, and after being reflected by the third light-combining element 206, the third light beam 223 reaches the light-collecting lens 210. The third light beam 223 reflected by the third light-combining element 206 is transmitted to the light-collecting lens 210 through a space between the first light source unit 201 and the first light-combining element 202.

Figure 1C:
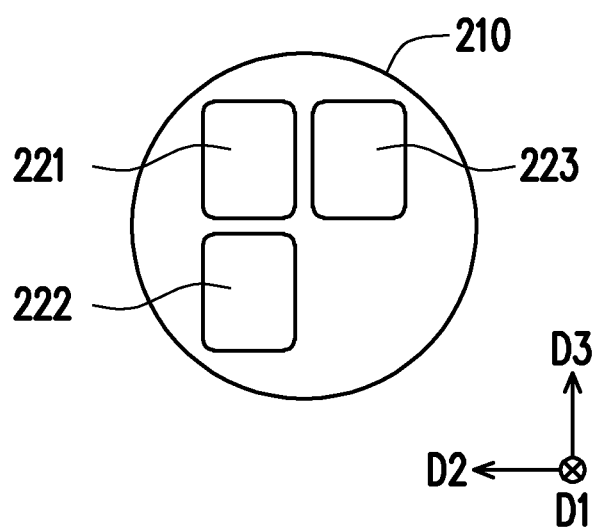
FIG. 1C is a schematic view of light spots on a light-collecting lens of the light source module according to the first embodiment of the disclosure.

Then, referring to FIG. 1C, FIG. 1C illustrates light spots formed on the light-collecting lens 210 by the first light beam 221 reflected by the first light-combining element 202, the second light beam 222 reflected by the second light-combining element 204, and the third light beam 223. According to FIG. 1A and FIG. 1B, it is learned that the first light-combining element 202 and the second light-combining element 204 are on a same side relative to the optical axis OA of the light-collecting lens 210, and the first light-combining element 202 and the third light-combining element 206 are respectively on different sides relative to the optical axis OA, where the first light-combining element 202 is relatively closer to the light-collecting lens 210 than the second light-combining element 204. Therefore, in FIG. 1C, both of the first light beam 221 and the second light beam 222 are imaged on a left side of the light-collecting lens 210, and a distance between the light spot formed on the light-collecting lens 210 by the first light beam 221 and the ground is greater than a distance between the light spot formed on the light-collecting lens 210 by the second light beam 222 and the ground. The third light beam 223 is reflected by the third light-combining element 206 and is then imaged on a right half of the light-collecting lens 210. In addition, according to FIG. 1C, it is learned that the first light source unit 201, the third light source unit 205, the first light-combining element 202, and the third light-combining element 206 are arranged on a same reference plane, and the second light source unit 203 and the second light-combining element 204 are arranged on another reference plane relatively lower in the third direction D3.

The first embodiment of the disclosure adopts the alternating arrangement of the various light source units and various light-combining elements and makes an effective use of a surface of the light-collecting lens. In this way, there are projections of at least two sets of light beams in two independent directions (i.e., the second direction D2 and the third direction D3 in the embodiment) on the lens surface, which increases a density of the number of light beams received on the lens, and meanwhile increases a luminous flux to meet the needs of high brightness.

Figure 2A:
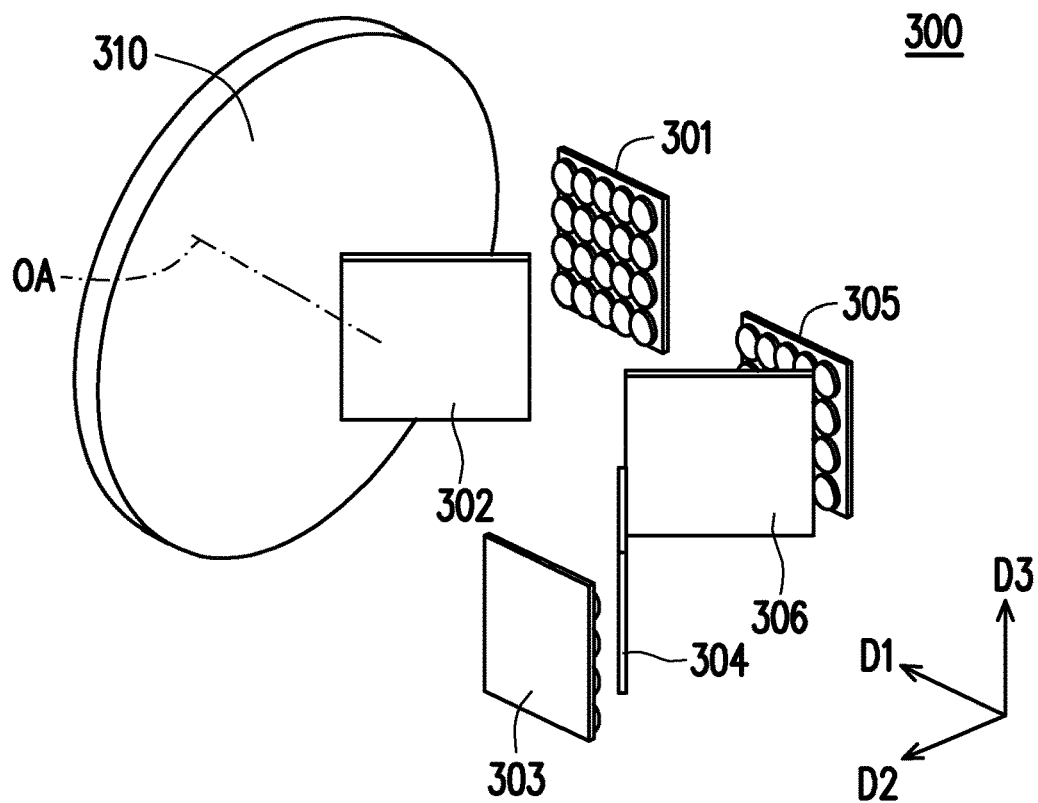
FIG. 2A and FIG. 2B are respectively a structural view and a top view of a light source module according to a second embodiment of the disclosure.
Figure 2B:
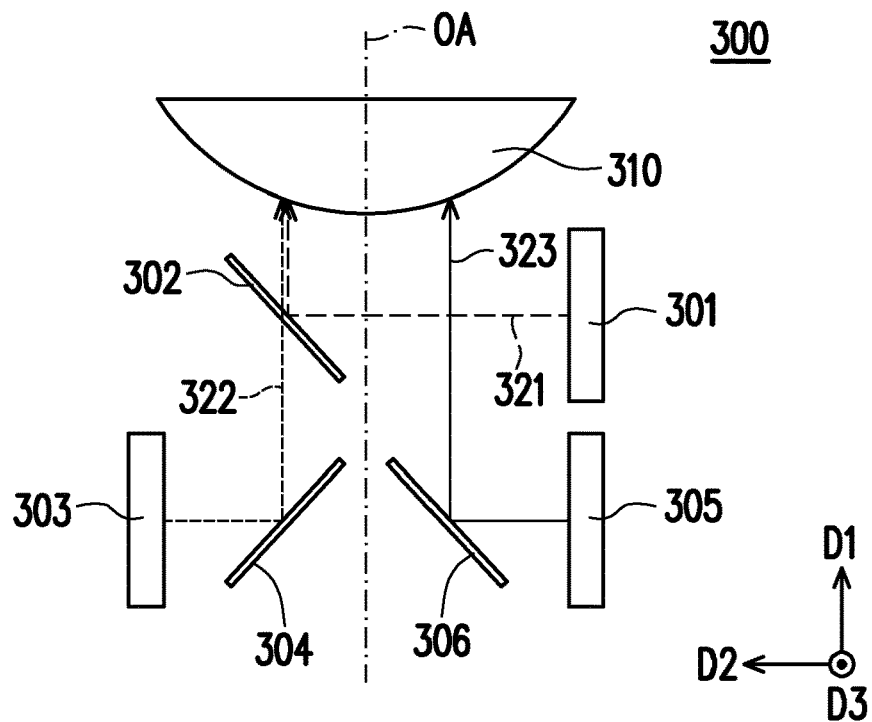
Figure 2C:
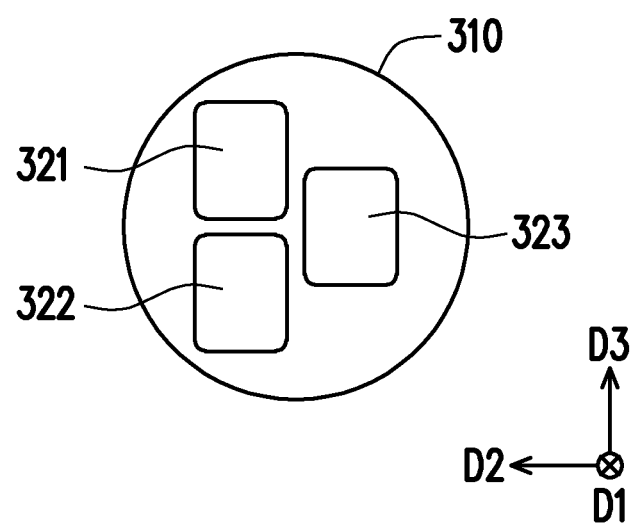
FIG. 2C is a schematic view of light spots on a light-collecting lens of the light source module according to the second embodiment of the disclosure.

Then, referring to FIG. 2A to FIG. 2C, FIG. 2A and FIG. 2B are respectively a structural view and a top view of a light source module 300 according to a second embodiment of the disclosure, and FIG. 2C is a schematic view of light spots on a light-collecting lens of the light source module according to the second embodiment of the disclosure. The light source module 300 includes a light-collecting lens 310, a first light source unit 301, a first light-combining element 302, a second light source unit 303, a second light-combining element 304, a third light source unit 305, and a third light-combining element 306. The first light source unit 301 is configured to emit a first light beam 321. The first light-combining element 302 is disposed in a transmission path of the first light beam 321, and reflects the first light beam 321 to the light-collecting lens 310. The second light source unit 303 is configured to emit a second light beam 322. The second light-combining element 304 is disposed in a transmission path of the second light beam 322, and reflects the second light beam 322 to the light-collecting lens 310. The third light source unit 305 is configured to emit a third light beam 323, and the third light-combining element 306 is disposed in a transmission path of the third light beam 323, and reflects the third light beam 323 to the light-collecting lens 310.

In order to facilitate the understanding of the concept of the disclosure, in the second embodiment, only the parts that are different from the first embodiment will be described, and the parts that are the same or similar to the first embodiment will not be repeated.

In the second embodiment, orientations of the first light source unit 301, the second light source unit 303, the first light-combining element 302, and the second light-combining element 304 with respect to the optical axis OA of the light-collecting lens 310 are the same as that of the first embodiment, which is not repeated. A difference between the second embodiment and the first embodiment is that the third light source unit 305 and the third light-combining element 306 are not arranged on the same reference plane as the first light source unit 301 and the first light-combining element 302. To be specific, the first light source unit 301 and the first light-combining element 302 are arranged on the same reference plane, the second light source unit 303 and the second light-combining element 304 are arranged on another reference plane which is relatively lower in the third direction D3, and the third light source unit 305 and the third light-combining element 306 are arranged on a reference plane located between the above two reference planes.

In the embodiment, referring to FIG. 2A to FIG. 2C, it is learned that the third light beam 323 reflected by the third light-combining element 306 is transmitted to the light-collecting lens 310 through a space between the first light-combining element 302 and the first light source unit 301 and a space below the above space.

The same part of the second embodiment and the first embodiment is that there are at least two sets of light beams in the second direction D2 and the third direction D3 for being transmitted to the light-collecting lens. The difference between the second embodiment and the first embodiment is that the light spots formed by the light source module 300 of the second embodiment are symmetrically distributed as a whole as shown in FIG. 2C. Compared with the light source module 200, the light source module 300 further improves uniformity of light beam distribution on the light-collecting lens.

Figure 3A:
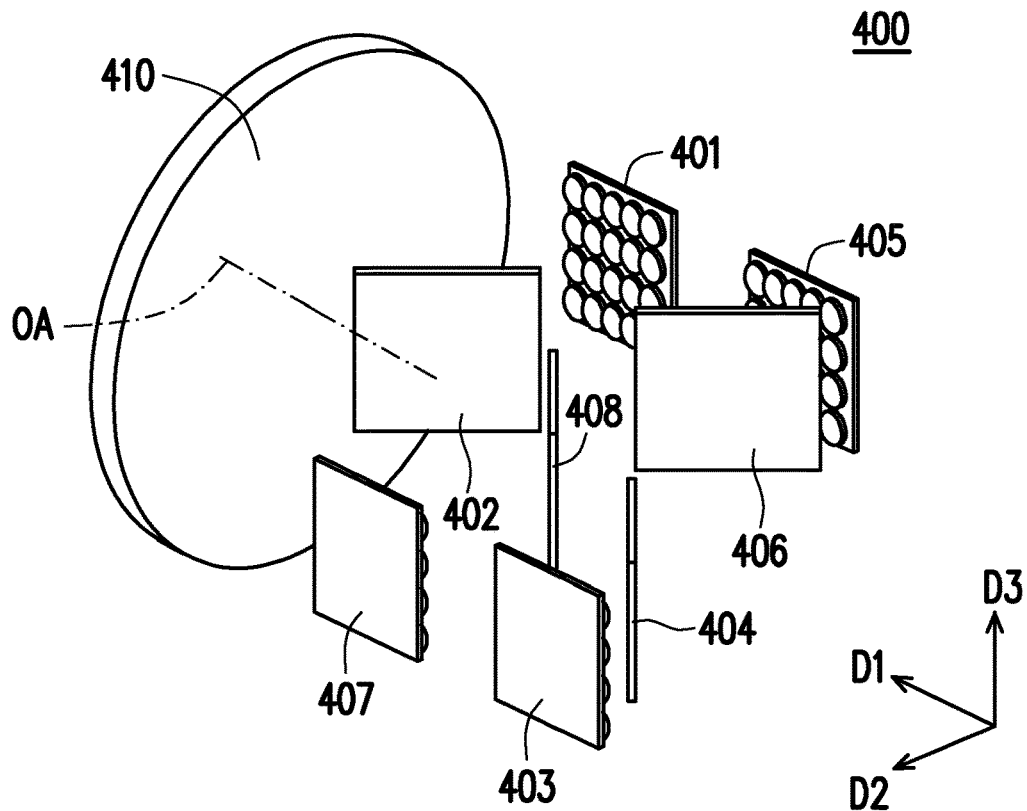
FIG. 3A and FIG. 3B are respectively a structural view and a top view illustrating a light source module according to a third embodiment of the disclosure.
Figure 3B:
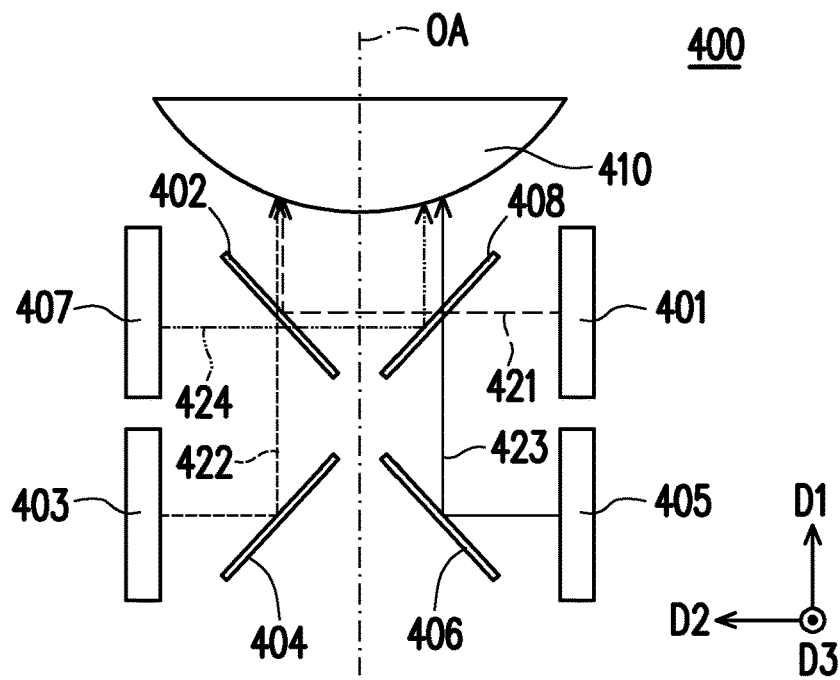
Figure 3C:
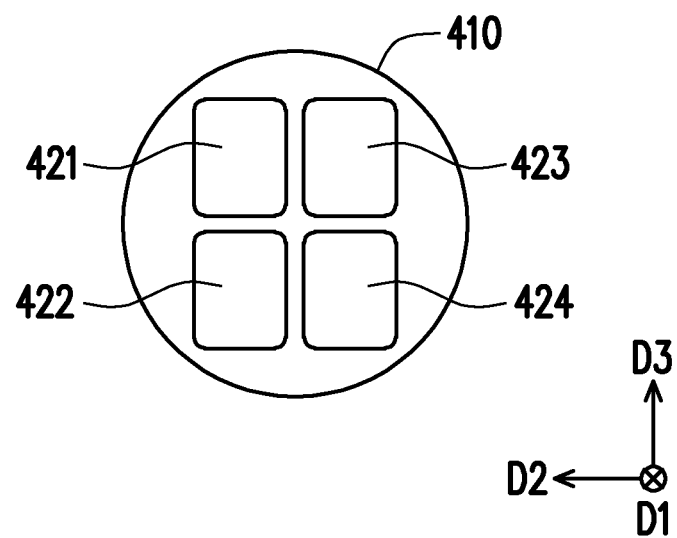
FIG. 3C is a schematic view of light spots on a light-collecting lens of the light source module according to the third embodiment of the disclosure.

Referring to FIG. 3A to FIG. 3C next, FIG. 3A and FIG. 3B are respectively a structural view and a top view of a light source module 400 according to a third embodiment of the disclosure. FIG. 3C is a schematic view of light spots on a light-collecting lens of the light source module according to the third embodiment of the disclosure. The light source module 400 includes a light-collecting lens 410, a first light source unit 401, a first light-combining element 402, a second light source unit 403, a second light-combining element 404, a third light source unit 405, and a third light-combining element 406. The first light source unit 401 is configured to emit a first light beam 421. The first light-combining element 402 is disposed in a transmission path of the first light beam 421 and reflects the first light beam 421 to the light-collecting lens 410. The second light source unit 403 is configured to emit a second light beam 422. The second light-combining element 404 is disposed in a transmission path of the second light beam 422 and reflects the second light beam 422 to the light-collecting lens 410. The third light source unit 405 is configured to emit a third light beam 423, and the third light-combining element 406 is disposed in a transmission path of the third light beam 423 and reflects the third light beam 423 to the light-collecting lens 410.

In the third embodiment, orientations of the first light source unit 401, the second light source unit 403, the third light source unit 405, the first light-combining element 402, the second light-combining element 404, and the third light-combining element 406 with respect to the optical axis OA of the light-collecting lens 410 are the same as that of the first embodiment, which is not repeated. A difference between the third embodiment and the first embodiment is that a fourth light source unit 407 and a fourth light-combining element 408 are further provided, and the fourth light-combining element 408 is disposed in a transmission path of a fourth light beam 424 emitted by the fourth light source unit 407, and reflects the fourth light beam 424 to the light-collecting lens 410.

Referring to FIG. 3A and FIG. 3C, the first light source unit 401, the third light source unit 405, the first light-combining element 402, and the third light-combining element 406 are arranged on a same reference plane. The second light source unit 403, the fourth light source unit 407, the second light-combining element 404 and the fourth light-combining element 408 are arranged on another reference plane that is relatively lower in the third direction D3.

The third light beam 423 reflected by the third light-combining element 406 is transmitted to the light-collecting lens 410 through a space between the first light-combining element 402 and the first light source unit 401, and the second light beam 422 reflected by the second light-combining element 404 is transmitted to the light-collecting lens 410 through a space between the fourth light-combining element 408 and the fourth light source unit 407.

The third embodiment adopts four sets of light source units and light-combining elements, and there are at least two sets of light beams in the second direction D2 and the third direction D3 for being transmitted to the light-collecting lens, and totally four sets of light beams are projected on the light-collecting lens 410, compared with the first embodiment and the second embodiment, the brightness thereof is further enhanced.

Figure 4A:
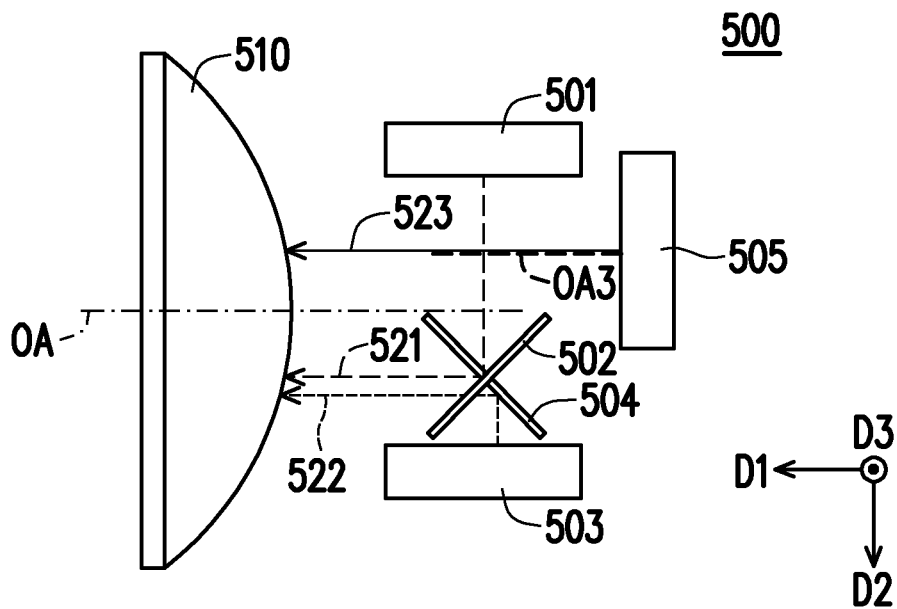
FIG. 4A and FIG. 4B are respectively a top view and a side view of a light source module according to a fourth embodiment of the disclosure.
Figure 4B:
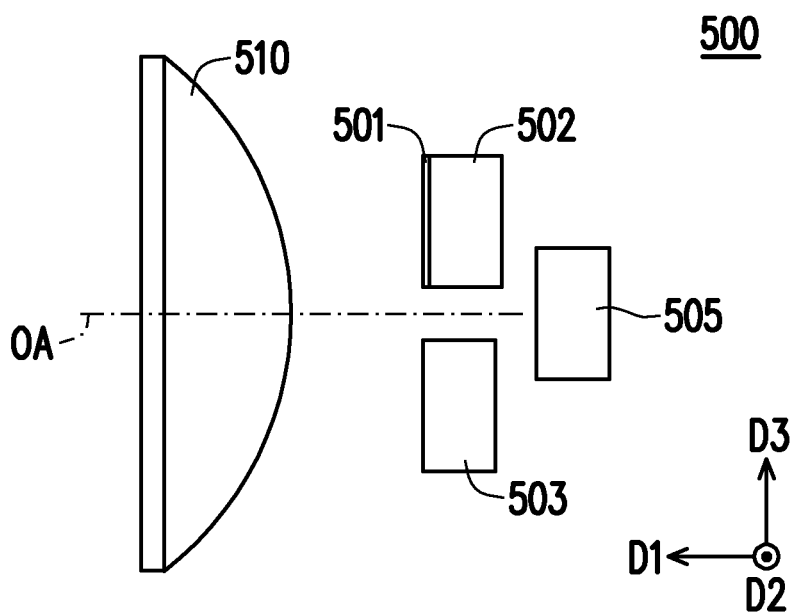
Figure 4C:
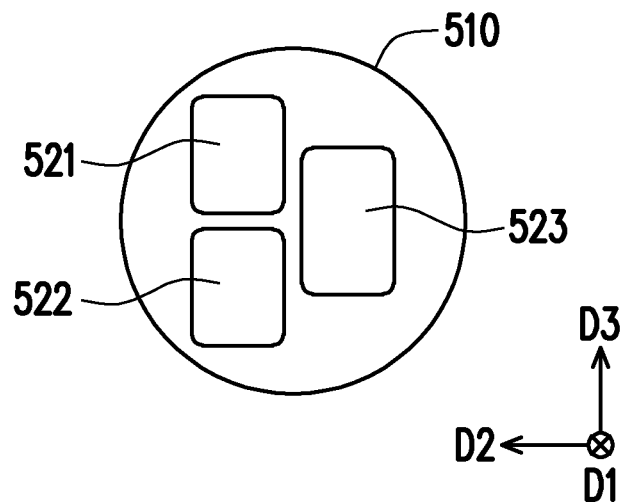
FIG. 4C is a schematic view of light spots on a light-collecting lens of the light source module according to the fourth embodiment of the disclosure.

Then, referring to FIG. 4A to FIG. 4C, FIG. 4A and FIG. 4B are respectively a top view and a side view of a light source module 500 according to a fourth embodiment of the disclosure. FIG. 4C is a schematic view of light spots on a light-collecting lens of the light source module according to the fourth embodiment of the disclosure.

The fourth embodiment has three sets of light source units, which are respectively a first light source unit 501, a second light source unit 503, and a third light source unit 505. However, different to the first to the third embodiments, the fourth embodiment has only two light-combining elements, which are respectively a first light-combining element 502 and a second light-combining element 504. The first light-combining element 502 and the second light-combining element 504 are disposed in an alternating manner in the third direction D3, and the first light source unit 501 and the second light source unit 503 are also disposed in an alternating manner in the third direction D3. A first light beam 521 emitted by the first light source unit 501 is reflected by the first light-combining element 502 and is incident to the light-collecting lens 510, a second light beam 522 emitted by the second light source unit 503 is reflected by the second light-combining element 504 and is incident to the light-collecting lens 510, and a third light beam 523 emitted by the third light source unit 505 is transmitted to the light-collecting lens 510 through a space between the first light source unit 501 and the first light-combining element 502 and a space below the above space.

In the embodiment, on the lens surface, there are also at least two sets of light beams projected in both of the second direction D2 and the third direction D3.

According to the embodiment, the optical axis OA of the light-collecting lens 510 may also be set to overlap with an optical axis OA3 of the third light source unit 505, but the disclosure is not limited thereto. The optical axis OA of the light-collecting lens 510 may also be set to deviate from the optical axis OA3 of the third light source unit 505.

Figure 5:
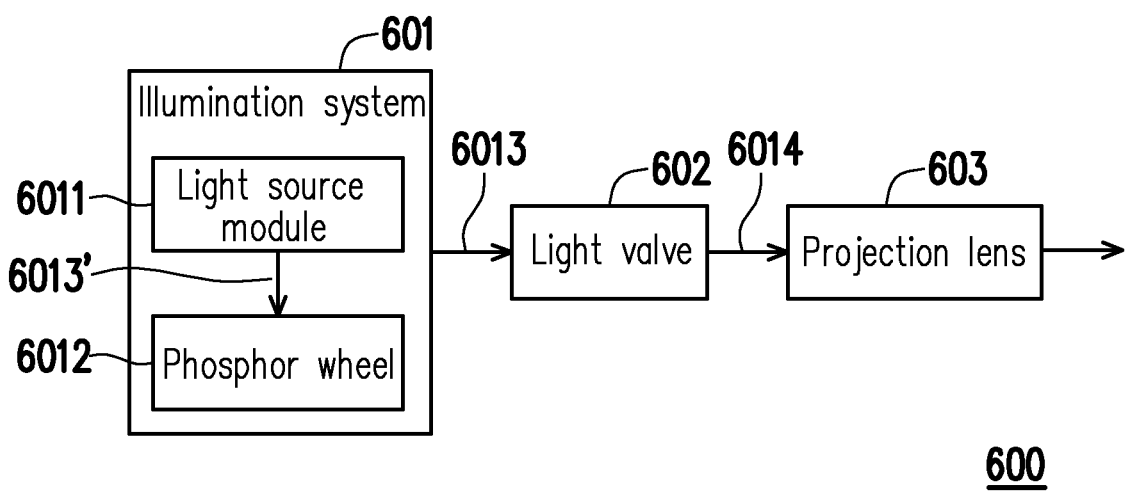
FIG. 5 is a block view illustrating a projection device according to a fifth embodiment of the disclosure.

Referring to FIG. 5, FIG. 5 is a block view illustrating a projection device 600 according to a fifth embodiment of the disclosure. The projection device 600 includes an illumination system 601, a light valve 602, and a projection lens 603. The illumination system 601 is configured to provide an illumination light beam 6013. The illumination system 601 includes a light source module 6011, and the light source module 6011 may be the light source module provided in any one of the above-mentioned first embodiment to the fourth embodiment. The light source module 6011 is configured to provide an excitation light beam 6013'. The excitation light beam 6013' may include the first light beam, the second light beam, and the third light beam provided in any one of the above-mentioned first, second, and fourth embodiments, or the excitation light beam 6013' may include the first beam, the second beam, the third beam, and the fourth beam as that provided in the third embodiment. The excitation light beam 6013' may form the illumination light beam 6013. The light valve 602 is disposed in a transmission path of the illumination light beam 6013 coming from the illumination system 601 to convert the illumination light beam 6013 into an image light beam 6014. The projection lens 603 is disposed in a transmission path of the image light beam 6014, and is configured to project the image light beam 6014 out of the projection device 600. According to the embodiment, the light valve 602 may be a digital micro-mirror device (DMD), a liquid-crystal-on-silicon panel (LCOS panel) or a transmissive liquid crystal display panel, but the disclosure is not limited thereto.

According to another embodiment of the disclosure, the illumination system may further include optical elements such as a wavelength conversion module, a filter module, an auxiliary light source, etc. The wavelength conversion module and the filter module are located in the transmission path of the excitation light beam 6013' to respectively produce a wavelength converted light beam and an illumination light beam successively. The auxiliary light source is configured to provide an auxiliary light beam to make red light to have a better optical performance. The illumination system may also be a three-cavity laser light source system, where the laser light source system may respectively provide laser light beams of different colors.

According to the embodiment, the illumination system 601 may further include a wavelength conversion module, such as a phosphor wheel 6012, and the phosphor wheel 6012 is disposed in a transmission path of the excitation light beam 6013' (for example, the first light beam, the second light beam, the third light beam of the aforementioned first, second, and fourth embodiments, or the first light beam, the second light beam, the third light beam, and the fourth light beam of the aforementioned third embodiment), where the light-collecting lens of the light source module 6011 transmits the excitation light beam 6013' to the phosphor wheel 6012 to excite fluorescence light (not shown). The excitation light beam 6013' may include multiple light beams of the same color, for example, all blue light beams. The fluorescent light (not shown) and the excitation light beam 6013' form the illumination light beam 6013, and the illumination light beam 6013 is transmitted to the light valve 602, so that the light valve 602 may provide a color image light beam 6014.

In summary, in the light source modules provided by the embodiments of the disclosure, the light source units and the light-combining elements are disposed in an alternating manner, as such, a reduced volume is provided. Therefore, in a limited space, the most light source units and light-combining elements are accommodated. The light source units are used together with the light-combining elements, and in this way, light beams are effectively transmitted, the requirement of high brightness is thereby achieved, and a projection device providing high brightness is accomplished.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents. Moreover, any embodiment of or the claims of the disclosure is unnecessary to implement all advantages or features disclosed by the disclosure. Moreover, the abstract and the name of the disclosure are only used to assist patent searching. Moreover, "first", "second", etc. mentioned in the specification and the claims are merely used to name the elements and should not be regarded as limiting the upper or lower bound of the number of the components/devices.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A light source module, comprising: a light-collecting lens, a first light source unit, a first light-combining element, a second light source unit, a second light-combining element, and a third light source unit, wherein
    the first light source unit is configured to emit a first light beam,
    the first light-combining element is disposed in a transmission path of the first light beam and reflects the first light beam to the light-collecting lens,
    the second light source unit is configured to emit a second light beam, the second light-combining element is disposed in a transmission path of the second light beam and reflects the second light beam to the light-collecting lens, and the third light source unit is configured to emit a third light beam, wherein the light-collecting lens is disposed in a transmission path of the third light beam, wherein an optical axis of the light-collecting lens is parallel to a first direction, an optical axis of the first light source unit is parallel to a second direction, the first light source unit and the second light source unit are disposed in an alternating manner in a third direction, and the first light-combining element and the second light-combining element are disposed in an alternating manner in the third direction, wherein the first direction, the second direction, and the third direction are perpendicular to one another, wherein the first light-combining element and the second light-combining element are arranged on a same side of the optical axis of the light-collecting lens in a view along the third direction, the first light source unit and the second light source unit are arranged on different sides of the optical axis of the light-collecting lens in the view along the third direction, and a light spot of the first light beam and a light spot of the second light beam formed on the light-collecting lens are aligned in the third direction.

2. The light source module according to claim 1, wherein the first light source unit and the second light source unit are also disposed in an alternating manner in the first direction, and the first light-combining element and the second light-combining element are also disposed in an alternating manner in the first direction.

3. The light source module according to claim 1, wherein the second light beam reflected by the second light-combining element is transmitted to the light-collecting lens through a space on one side of the first light-combining element in the third direction.

4. The light source module according to claim 1, wherein the light source module further comprises a third light-combining element disposed in the transmission path of the third light beam and reflecting the third light beam coming from the third light source unit to the light-collecting lens.

5. The light source module according to claim 4, wherein the first light source unit, the third light source unit, the first light-combining element, and the third light-combining element are disposed on a first reference plane, the second light source unit and the second light-combining element are disposed on a second reference plane, and the first reference plane and the second reference plane are arranged in the third direction.

6. The light source module according to claim 5, wherein the third light beam reflected by the third light-combining element is transmitted to the light-collecting lens through a space between the first light-combining element and the first light source unit.

7. The light source module according to claim 4, wherein the first light source unit and the first light-combining element are disposed on a first reference plane, the second light source unit and the second light-combining element are disposed on a second reference plane, and the third light source unit and the third light-combining element are disposed on a third reference plane, wherein the first reference plane, the third reference plane, and the second reference plane are sequentially arranged in the third direction.

8. The light source module according to claim 7, wherein the third light beam reflected by the third light-combining element is transmitted to the light-collecting lens through a space between the first light-combining element and the first light source unit and a space on one side thereof in the third direction.

9. The light source module according to claim 4, wherein the light source module further comprises a fourth light source unit and a fourth light-combining element, wherein the fourth light source unit is configured to emit a fourth light beam, and the fourth light-combining element is disposed in a transmission path of the fourth light beam and reflects the fourth light beam to the light-collecting lens.

10. The light source module according to claim 9, wherein the first light source unit, the third light source unit, the first light-combining element, and the third light-combining element are disposed on a first reference plane, the second light source unit, the fourth light source unit, the second light-combining element, and the fourth light-combining element are disposed on a second reference plane, and the first reference plane and the second reference plane are arranged in the third direction.

11. The light source module according to claim 10, wherein the third light beam reflected by the third light-combining element is transmitted to the light-collecting lens through a space between the first light-combining element and the first light source unit, and the second light beam reflected by the second light-combining element is transmitted to the light-collecting lens through a space between the fourth light-combining element and the fourth light source unit.

12. The light source module according to claim 1, wherein the first light-combining element and the second light-combining element are arranged in the third direction.

13. The light source module according to claim 12, wherein the third light beam emitted by the third light source unit is transmitted to the light-collecting lens through a space between the first light-combining element and the first light source unit and a space on one side thereof in the third direction.

14. A projection device, comprising an illumination system, a light valve, and a projection lens, wherein the illumination system is configured to provide an illumination light beam, and the illumination system comprises a light source module, wherein the light source module is configured to provide an excitation light beam, wherein the light source module comprises a light-collecting lens, a first light source unit, a first light-combining element, a second light source unit, a second light-combining element, and a third light source unit, wherein the first light source unit is configured to emit a first light beam, the first light-combining element is disposed in a transmission path of the first light beam and reflects the first light beam to the light-collecting lens, the second light source unit is configured to emit a second light beam, the second light-combining element is disposed in a transmission path of the second light beam and reflects the second light beam to the light-collecting lens, and the third light source unit is configured to emit a third light beam, wherein the light-collecting lens is disposed in a transmission path of the third light beam, wherein an optical axis of the light-collecting lens is parallel to a first direction, an optical axis of the first light source unit is parallel to a second direction, the first light source unit and the second light source unit are disposed in an alternating manner in a third direction, and the first light-combining element and the second light-combining element are disposed in an alternating manner in the third direction, wherein the first direction, the second direction, and the third direction are perpendicular to one another, and the excitation light beam comprises the first light beam, the second light beam, and the third light beam, and the excitation light beam forms the illumination light beam, the light valve is disposed in a transmission path of the illumination light beam to convert the illumination light beam into an image light beam, and the projection lens is disposed in a transmission path of the image light beam for projecting the image light beam out of the projection device, wherein the first light-combining element and the second light-combining element are arranged on a same side of the optical axis of the light-collecting lens in a view along the third direction, the first light source unit and the second light source unit are arranged on different sides of the optical axis of the light-collecting lens in the view along the third direction, and a light spot of the first light beam and a light spot of the second light beam formed on the light-collecting lens are aligned in the third direction.

15. The projection device according to claim 14, wherein the first light source unit and the second light source unit are also disposed in an alternating manner in the first direction, and the first light-combining element and the second light-combining element are also disposed in an alternating manner in the first direction.

16. The projection device according to claim 14, wherein the second light beam reflected by the second light-combining element is transmitted to the light-collecting lens through a space on one side of the first light-combining element in the third direction.

17. The projection device according to claim 14, wherein the projection device further comprises a third light-combining element disposed in the transmission path of the third light beam and reflecting the third light beam coming from the third light source unit to the light-collecting lens.

18. The projection device according to claim 17, wherein the first light source unit, the third light source unit, the first light-combining element, and the third light-combining element are disposed on a first reference plane, the second light source unit and the second light-combining element are disposed on a second reference plane, and the first reference plane and the second reference plane are arranged in the third direction.

19. The projection device according to claim 18, wherein the third light beam reflected by the third light-combining element is transmitted to the light-collecting lens through a space between the first light-combining element and the first light source unit.

20. The projection device according to claim 17, wherein the first light source unit and the first light-combining element are disposed on a first reference plane, the second light source unit and the second light-combining element are disposed on a second reference plane, and the third light source unit and the third light-combining element are disposed on a third reference plane, wherein the first reference plane, the third reference plane, and the second reference plane are sequentially arranged in the third direction.

21. The projection device according to claim 20, wherein the third light beam reflected by the third light-combining element is transmitted to the light-collecting lens through a space between the first light-combining element and the first light source unit and a space on one side thereof in the third direction.

22. The projection device according to claim 17, wherein the projection device further comprises a fourth light source unit and a fourth light-combining element, wherein the fourth light source unit is configured to emit a fourth light beam, and the fourth light-combining element is disposed in a transmission path of the fourth light beam and reflects the fourth light beam to the light-collecting lens.

23. The projection device according to claim 22, wherein the first light source unit, the third light source unit, the first light-combining element, and the third light-combining element are disposed on a first reference plane, the second light source unit, the fourth light source unit, the second light-combining element, and the fourth light-combining element are disposed on a second reference plane, and the first reference plane and the second reference plane are arranged in the third direction.

24. The projection device according to claim 23, wherein the third light beam reflected by the third light-combining element is transmitted to the light-collecting lens through a space between the first light-combining element and the first light source unit, and the second light beam reflected by the second light-combining element is transmitted to the light-collecting lens through a space between the fourth light-combining element and the fourth light source unit.

25. The projection device according to claim 14, wherein the first light-combining element and the second light-combining element are arranged in the third direction.

26. The projection device according to claim 25, wherein the third light beam emitted by the third light source unit is transmitted to the light-collecting lens through a space between the first light-combining element and the first light source unit and a space on one side thereof in the third direction.

* * * * *